United States Patent [19]

Pufpaff et al.

[11] E Re. 31,106

[45] Reissued Dec. 21, 1982

[54] QUARTER TURN INDUSTRIAL FASTENER

[75] Inventors: Frederick J. Pufpaff, Loudonville; Cuyler Hoen, Rennesselaer, both of N.Y.

[73] Assignee: Simmons Fastener Corporation, Albany, N.Y.

[21] Appl. No.: 280,555

[22] Filed: Jul. 6, 1981

Related U.S. Patent Documents

Reissue of:

[64] Patent No.: 4,212,560
Issued: Jul. 15, 1980
Appl. No.: 54,015
Filed: Jul. 2, 1979

[51] Int. Cl.[3] ..... B25G 3/00; F16D 1/00

[52] U.S. Cl. ..... 403/353; 403/146; 403/162

[58] Field of Search ..... 403/19, 353, 388, 162, 403/146

[56] References Cited

U.S. PATENT DOCUMENTS

| | | | |
|---|---|---|---|
| 2,360,626 | 10/1944 | Weiser | 151/5 |
| 2,809,856 | 10/1957 | Alexander | 403/146 |
| 3,017,217 | 1/1962 | Keating | 403/353 X |
| 3,398,496 | 8/1968 | Mischke | 151/38 X |
| 3,879,906 | 4/1975 | Hollenberg | 403/353 X |
| 3,966,340 | 6/1976 | Morris | 403/353 |
| 3,986,780 | 10/1976 | Nivet | 403/353 |
| 4,014,195 | 3/1977 | Grogan | 403/353 |
| 4,026,183 | 5/1977 | Bart | 151/38 X |
| 4,035,097 | 7/1977 | Bachand | 403/353 X |
| 4,129,395 | 12/1978 | Theurer et al. | 403/353 X |
| 4,135,694 | 1/1979 | Stegenga | 403/146 X |
| 4,138,838 | 2/1979 | Long | 403/146 X |
| 4,212,560 | 7/1980 | Pufpaff et al. | 403/388 X |

FOREIGN PATENT DOCUMENTS

| | | | |
|---|---|---|---|
| 2004292 | 8/1970 | Fed. Rep. of Germany | 403/388 |

*Primary Examiner*—Wayne L. Shedd
*Attorney, Agent, or Firm*—Eliot Gerber

[57] ABSTRACT

An industrial fastener, which may be secured or released by a one-quarter turn, includes a rotatable bolt. The bolt has a cam face on the underside of its head, a shank having opposite flats and a screw threaded end portion. A turning means, such as a handle member, slides on the bolt and has matching opposite flats to turn the bolt. The fastener also includes a spring which detents the handle member and an adjustable nut.

13 Claims, 6 Drawing Figures

QUARTER TURN INDUSTRIAL FASTENER

Matter enclosed in heavy brackets [ ] appears in the original patent but forms no part of this reissue specification; matter printed in italics indicates the additions made by reissue.

BACKGROUND OF THE INVENTION

The present invention relates to industrial fasteners and more particularly to a one-quarter turn industrial fastener.

Some types of industrial fasteners may be used to removably connect two panels; for example, the panels may be the enclosures of industrial equipment. It may be desired to secure the two panels together so that they will not become loosened in ordinary usage and yet may be rapidly separated when necessary, for example, for repair or maintenance.

When the two panels are of relatively rigid metal and it is desired that they be maintained in their joined relationship under considerable force of separation, special problems are presented. For example, the two panels may be steel plates which may be subjected to separation forces as high as 1,000 pounds. Many types of lightweight industrial fasteners would not be suitable under those conditions but would come apart and permit separation of the panels. It is possible to join the panels by conventional bolts and nuts which would have to be unscrewed to permit separation of the two panels. However, the separation of a bolt and its nut, particularly if they are tightened, may be a time-consuming task, may require many turns of either the bolt or the nut, and requires access to both sides of the panels.

One type of one-quarter turn industrial fastener using a cam bolt structure is known from Ernest Schlueter's U.S. Pat. No. 3,124,993, patented Mar. 17, 1962. That device has found commercial acceptance and solves many of the problems presented by the need for rapid fastening and unfastening. That device, however, is relatively complex, may be relatively expensive to manufacture, and requires the use of a separate tool for locking and unlocking.

OBJECTIVES AND FEATURES OF THE INVENTION

It is an objective of the present invention to provide a heavy-duty cam bolt type of fastener which utilizes fewer components and is consequently relatively less expensive to manufacture than previously known industrial fasteners of this type.

It is a further objective of the present invention to present a heavy duty industrial fastener which may be readily opened (unlocked) by rotation of a handle one-quarter of a turn and which may be tightened (locked) by rotation in the opposite direction one-quarter of a turn.

It is a further objective of the present invention to provide such an industrial fastener which will hold relatively heavy plates in a firm position, prevent their lateral displacement or slippage and provides shear and tensile load ratings equal to conventional bolts.

It is a still further objective of the present invention to provide such a heavy-duty industrial fastener which will prevent movement or separation of the plates even under adverse environmental conditions and under high separation forces.

It is a feature of the present invention to provide an industrial fastener assembly which may be adjusted in the field to lock together two plates and after such adjustment the plates may provide repeated pressure-tight closings. The fastener may be locked or unlocked by a one-quarter turn of a handle and may include a spacer bushing to provide a positive fastening position.

The fastener assembly includes a first plate having a through opening of a special shape, having an elongated direction and a shortened direction at substantially right angles. The second plate also has an opening, which may be a round hole, which opening aligns with the opening of the first plate upon locking the two plates. The fastener includes a cam bolt member having a head portion with a top face, a bottom face, elongated opposite sides and relatively shortened opposite sides. The head portion fits through the opening in the first plate. The bottom face has at least one cam surface and preferably two cam surfaces at diagonally opposite corners. The cam bolt member is turned by a turning means. For this purpose its shaft portion has, at an intermediate position, a pair of flattened sides. The shaft portion has external screw threads proximate to its end opposite said head portion to allow adjustment of the cam bolt assembly.

The assembly also includes a spring member of resilient material having a hole through which said shaft protrudes and freely rotates therein. The spring member is preferably a rectangular bowed member having a pair of oppositely directed raised portions extending substantially outwardly from said hole along an imaginary bisector of said hole, the raised portions acting as detents.

A turning means having external means (a handle) is used to rotate the turning means. The turning means has a hole through having flattened internal side walls (to meet said flattened sides of said cam bolt shaft) so that turning of said turning means will turn the cam bolt. The turning means has a flat portion in a plane vertical to the axis of said cam bolt, the flat portion having an upper and a lower face. The lower face has four indentations at a substantially equidistant 90° radial spacing and outwardly directed from the turning means hole. The raised portion of said spring removably detents in two oppositely directed indentations.

A nut member having internal screw threads is screwed onto the screw threads of the cam bolt member. The spring member exerts pressure between the turning means and the second plate.

In addition, retaining means may be associated with the cam bolt member to secure said nut in tightened position. The retaining means may be a hole through the cam bolt shaft, a series of indentations in one face of the nut member and a cotter pin through the shaft and within at least one of the indentations.

BRIEF DESCRIPTION OF THE DRAWINGS

Other objectives and features of the present invention will be apparent from the detailed description which follows, which provides the inventor's presently known best mode of practicing the invention. The following detailed description should be, for best comprehension, taken in conjunction with the accompanying drawings.

In the drawings.

DETAILED DESCRIPTION OF THE INVENTION

Figure 1:
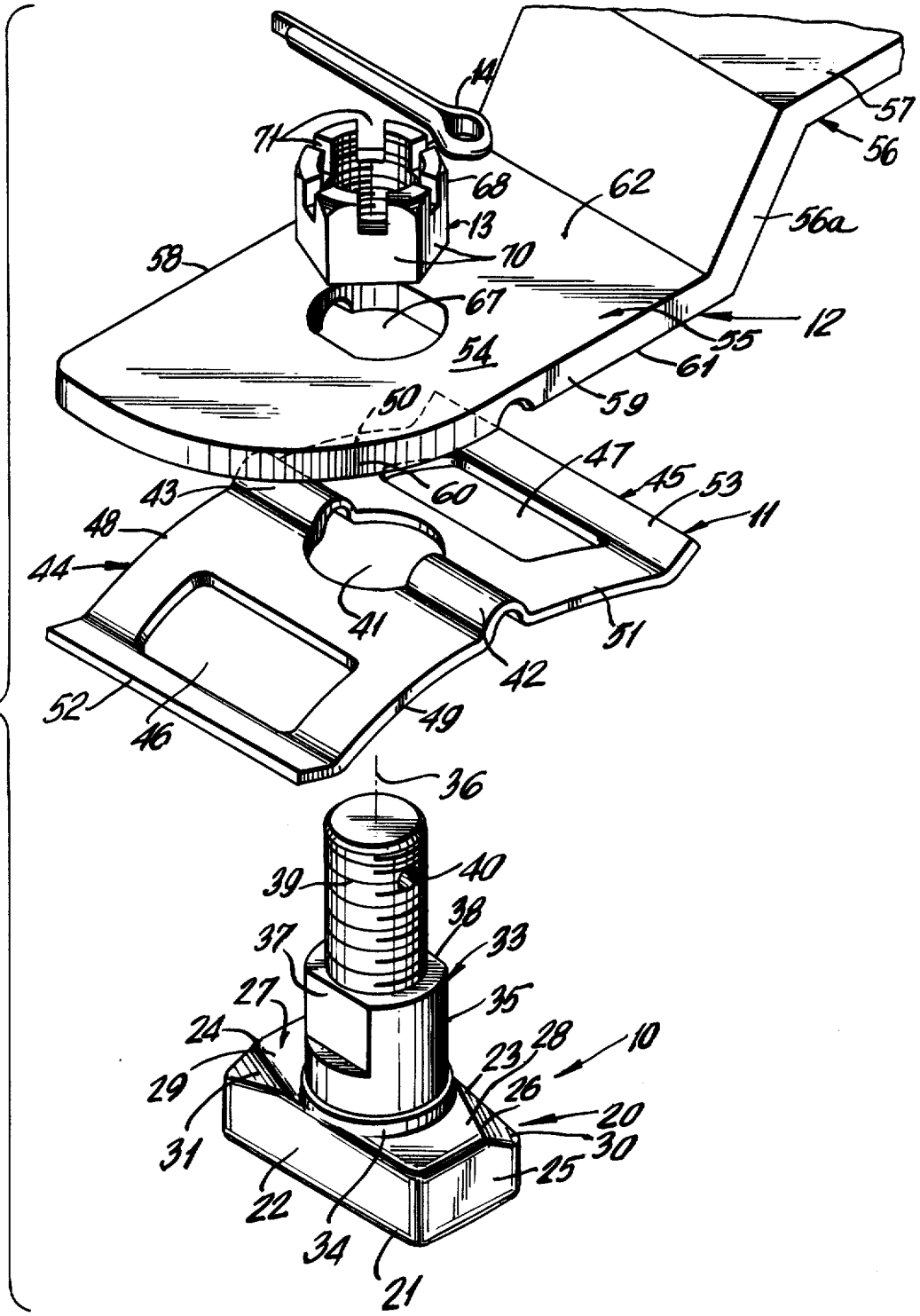
FIG. 1 is an exploded and perspective view of the various components comprising the cam bolt assembly of the present invention.
Figure 2:
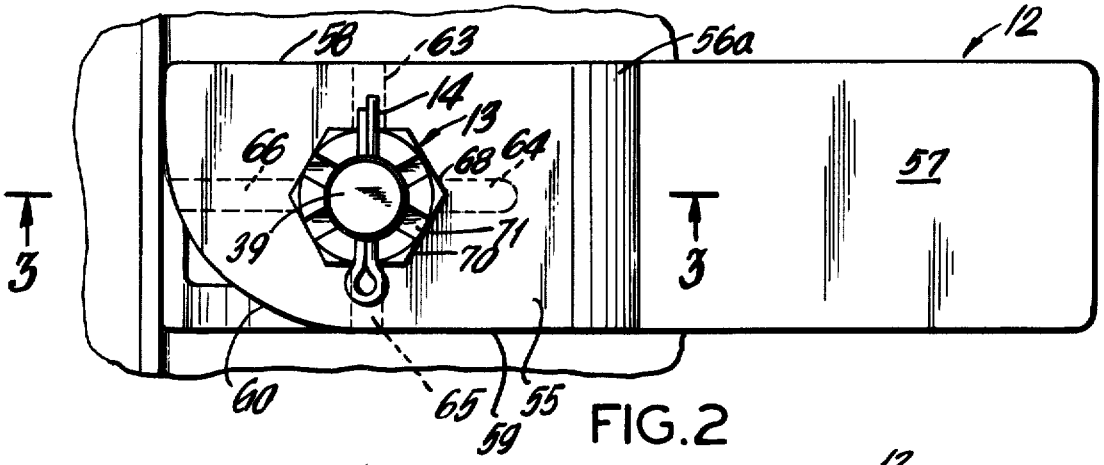
FIG. 2 is a bottom plan view of the cam bolt assembly of the present invention.

As shown in FIG. 1, the cam bolt assembly of the present invention generally comprises five separate members, exclusive of the plates which it joins. These five members are the cam bolt 10, a spring washer 11, a handle member 12, a nut 13 and a retaining member 14 such as a cotter pin.

As shown in FIG. 1, a cam bolt 10 has a head portion 20 having a generally flat upper surface 21. Preferably the cam bolt 10 is of zinc plated steel. The upper surface 21 is perpendicular to the generally flat side faces 22 and 23, which permit the cam bolt to be held by a wrench or other suitable tool, although generally such holding action is not required. The opposite ends 24 and 25 of the cam bolt head are shown as being rounded, although their shape is not critical since those ends would not be normally used to hold the cam bolt.

The underside face of the cam bolt head has two opposite sides 26 and 27. Each of the sides, respectively 26 and 27, has a flat portion, respectively 28 and 29, and a cam (angled) portion, respectively 30 and 31. The flat portions are parallel to the flat upper surface of the head portion and the cam surface directed in opposite directions to each other. If one were to imagine a plane through the flat underside surface, then the cams would be at about a 30-degree angle relative to the plane. The cam comprises the head portion 20, described above, and a shaft portion 33. The shaft portion 33 has, at its top (as shown in FIG. 1) a circular portion 34 which is a right-angled cylinder having as its center the imaginary axis 36 and a center portion 35, which is also a right-angled cylinder having as its center the imaginary axis 36. The opposite flattened portions, respectively 37 and 38, are provided on opposite sides of the shaft portion. The bottom portion of the cam bolt is threaded with conventional screw threads 39. A hole 40 is provided through the shaft and lies preferably at right angles to the axis and is aligned so that its opposite bores are aligned with the flattened portions.

The spring washer 11 serves to maintain the distance between the inner panel and the stop member. The spring washer has a central hole 41 through which the shaft of the cam bolt protrudes. The hole 41 is sufficiently large, and is circular in top plan view, to permit free rotation of the shaft of the cam bolt. The spring washer 11 has two protrusions 42 and 43 which are directed outwardly from hole 41 along a diameter of the hole 41. The detent protrusions 42 and 43 are in the apex of oppositely directed body portions 44 and 45. As shown, the body portions 44 and 45 have openings, respectively 46 and 47, so that each of the body portions has two opposite arm portions, the arm portions being 48 and 49 and 50 and 51, respectively. Upwardly turned bottom portions 52 and 53 are integral with the arms and provide a surface against which the plate is held.

The handle member 12 is used to lock and unlock the cam bolt assembly. The handle member 12 comprises generally a gripping portion 54 and a stop portion 55, preferably formed as a single integral member of steel or other metal. The handle portion 56 has an angled connection portion 56a and a straight portion 57. The stop portion has an inner face 61 and an outer face 62, a straight side 58, an opposite shorter straight side 59, and a curved side 60 joining the two straight sides 58 and 59. The inner face 61 of the stop portion has four indentations 63, 64, 65 and 66. These indentations 62–66 are evenly spaced at 90° around a hole 67 in stop portion 55. The shaft portion of the cam bolt protrudes through the hole 67.

The nut 13 has internal screw threads which permit the nut to be screwed onto the screw thread 39 of the shaft portion 33 of the cam bolt. The side of the nut 13 is a series of connected plane faces 68 to enable the nut to be rotated by a conventional tool, such as a wrench. The inner face 69 of the nut, which is tightened against the outer face 62 of the stop portion 55, is preferably flat. The opposite outer face 70 of the nut 13 has a series of indentations 71.

A retaining member 14 is placed through the hole 40 of the cam bolt and through two of the indentations 71. As shown in the drawing, a suitable retaining member 14 is a cotter pin. The retaining member 14 prevents rotation of the nut 13 after the nut 13 has been tightened onto the cam bolt 10.

In the embodiment shown in FIGS. 1–4, the rotation of the handle 57 is limited by a flange 72 of the second plate 73. The plate 73 has a round hole which aligns, for locking, with the opening of the plate 74.

Figure 3:
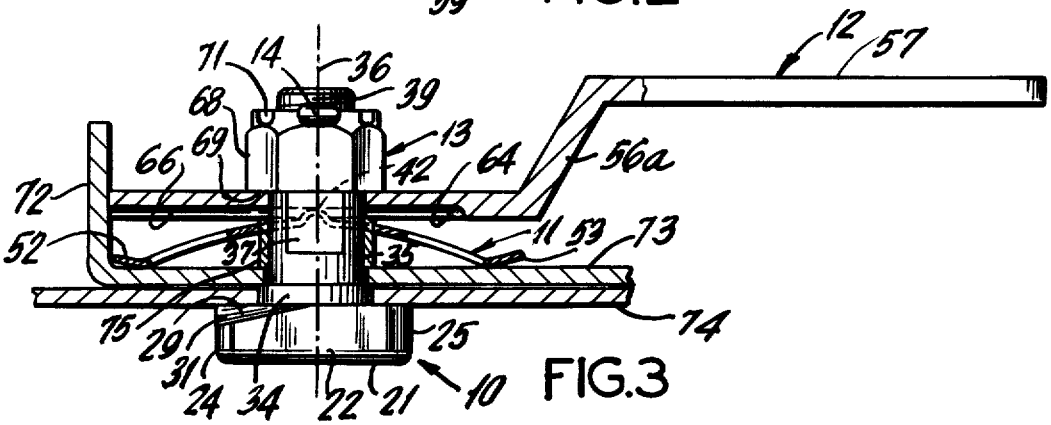
FIG. 3 is a side cross-sectional view of the cam bolt assembly of the present invention in position and securing two plates, taken along line 3—3 of FIG. 2 looking in the direction of the arrows.
Figure 4:
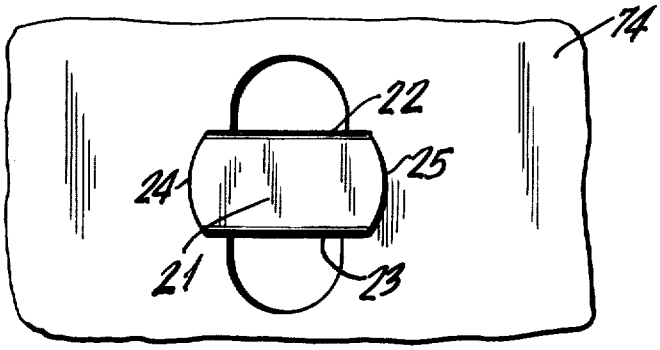
FIG. 4 is a top plan view of the upper plate showing the head portion of the cam bolt in relationship to the plate when the cam bolt is in its locked position.
Figure 5:
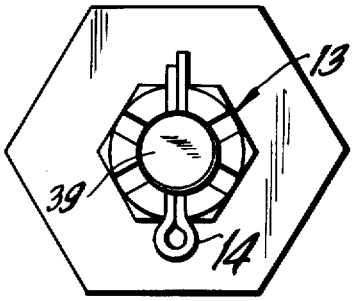
FIG. 5 is a bottom plan view of an alternative embodiment of the cam bolt of the present invention.
Figure 6:
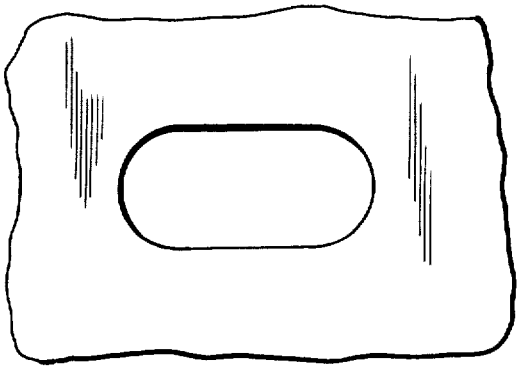
FIG. 6 is a top plan view of the opening in the first plate.

To make the fastener positive so that the spring 11 does not carry the load, a ring 75 (spacer bushing) shown in FIG. 3 may be used, although such a ring is optional. In the embodiment shown in FIG. 3, the ring 75 is free floating and its outer diameter passes freely through hole 41 in spring 11. The ring is held between, and forms the gap between, the handle stop portion 55 and the plate 73. An alternative to the separate ring (spacer bushing) 75 is a bushing (not shown) fixed to handle 12 and passing through hole 41, the bushing serving the same positive spacing function as the ring 75.

What is claimed is:

1. An industrial fastener assembly for removably locking together two plates by a one-quarter turn of the fastener, including a first place having an opening therethrough having an elonagated direction and a shortened direction at substantially a right angle thereto;

a second plate having a hole therethrough which is adapted to align with the hole of the first plate upon locking together the two plates;

a cam bolt member having a head portion, said head portion having a top face, a bottom face, elongated opposite sides in its length direction which are parallel to each other and to the bolt axis, and relatively shortened opposite sides in its width direction at a right angle to said elongated sides so that said head portion fits through the hole in said first plate, at least a portion of the diagonally opposite end corners of said bottom face being removed to form two cam surfaces merging the adjacent bottom and side faces, said cam surfaces engaging marginal portions of the hole of said first plate upon locking of said fastener assembly;

said cam bolt member having a shaft portion having at an intermediate position a pair of flattened sides, said shaft portion having external screw threads proximate to its end opposite said head portion;

a spring member of resilient material having a hole through which said shaft protrudes and freely rotates therein, said spring member having a pair of oppositely directed raised portions forming detent ridge means and extending substantially outwardly from said hole along an imaginary bisector of said hole;

a turning means having external means to permit the turning means to be rotated, a hole through said turning means having flattened internal side walls to meet said flattened sides of said cam bolt shaft so that turning of said turning means will turn said cam bolt member, said turning means being slidable on said cam bolt shaft, said turning means having a body portion in a plane vertical to the axis of said cam bolt and having an upper and a lower face, and four indentations in said lower face at a substantially equidistant spacing, said indentations being outwardly directed along imaginary extended radii of said turning means hole, said raised portion of said spring removably detenting two opppositely directed indentations; and a nut member having internal screw threads which are screwed onto said screw threads of said cam bolt member;

said spring member exerting pressure between said turning means and said second plate.

2. An industrial fastener assembly as in claim 1 and further comprising retaining means associated with said cam bolt member to secure said nut in its tightened position.

3. An industrial fastener assembly as in claim 2 wherein said retaining means is a hole through said cam bolt shaft, a series of indentations in one face of said nut member and a cotter pin through said hole and within at least one of said indentations.

4. An industrial fastener assembly as in claim 1 wherein said spring member is a bowed rectangular spring having a central portion whose detent ridge means is said raised portion and four outwardly extending arm portions at an angle to the plane of said flat portion of said turning means.

5. An industrial fastener assembly as in claim 4 wherein each pair of legs is integral with a cross-piece which bears on said second plate.

6. An industrial fastener assembly as in claim 1 wherein said external means of said turning means is a handle integral with said turning means.

7. An industrial fastener assembly for removably locking together two plates on one-quarter turn of the fastener, including a first plate having a non-round opening therethrough having an elongated slit portion and a shortened slit portion crossing at substantially a right angle thereto;

a second plate having an opening therethrough which opening is adapted to align with the opening of the first plate upon locking together the two plates;

a cam bolt member having a head portion having a top face, a bottom face, a pair of elongated opposite sides and a pair of relatively shortened opposite sides in its width direction at a right angle to said elongated sides so that said elongated opposite sides of said head portion fit through said elongated slit portion in said first plate, said cam bolt member bottom face having at least one cam surface;

said cam bolt member having a shaft portion having at an intermediate position contact means to rotate said shaft, said shaft portion having [adjustment] *securing* means proximate to its end opposite said head portion;

a spring member of resilient material having a hole through which said shaft protrudes and freely rotates therein, said spring member having a pair of oppositely directed raised detents extending substantially outwardly from said hole;

a turning means having external means to permit the turning means to be rotated, said turning means having means to contact said contact means of said cam bolt shaft so that rotation of said turning means will rotate said cam bolt member, said turning means having a body portion in a plane vertical to the axis of said cam bolt shaft having an upper and a lower face, and a series of indentations in said lower face at a substantially equal spacing, said indentations being outwardly directed from said turning means hole, said detent portions of said spring removably detenting in said indentations; and a fastening member having fastening means which is [removably] attached onto said [adjustment] *securing* means of said cam bolt member;

said spring member exerting pressure between said turning means and said second plate.

8. An industrial fastener assembly as in claim 1 wherein said bottom face of said head portion has two angled cam faces at diagonally opposite corners of said bottom face.

[9. An industrial fastener assembly as in claim 7 and further comprising retaining means associated with said cam bolt member to secure said nut in tightened position.]

[10. An industrial fastener assembly as in claim 9 wherein said retaining means is a hole through said cam bolt shaft, a series of indentations in one face of said nut member and a cotter pin through said hole and within at least one of said indentations.]

11. An industrial fastener assembly as in claim 7 wherein said spring member has a central portion whose apex is said raised portion and four outwardly extending arm portions at an angle to the plane of said flat portion of said turning means.

12. An industrial fastener assembly as in claim 11 wherein each pair of legs is integral with a cross-piece which bears on said second plate.

13. An industrial fastener assembly as in claim 7 wherein said external means of said turning means is a handle integral with said turning means.

14. An industrial fastener as in claim 7 and further including positive spacing means bearing against and spacing said second plate and said turning means which spacing means protrudes through said hole in said spring member.

15. An industrial fastener as in claim 14 wherein said spacing means is a ring which freely slides on said cam bolt member.

* * * * *